(12) United States Patent
Ryu et al.

(10) Patent No.: US 10,216,946 B2
(45) Date of Patent: Feb. 26, 2019

(54) CLOUD-BASED SECURE PRINTING SYSTEM AND METHOD OF PROCESSING SAME

(71) Applicant: MWSTORY Co., Ltd., Seoul (KR)

(72) Inventors: Dae-Gull Ryu, Seoul (KR); Sang Won Woo, Namyangju-si (KR)

(73) Assignee: MWSTORY CO., LTD., Seoul (KR)

(*) Notice: Subject to any disclaimer, the term of this patent is extended or adjusted under 35 U.S.C. 154(b) by 0 days.

(21) Appl. No.: 15/567,403

(22) PCT Filed: Apr. 20, 2016

(86) PCT No.: PCT/KR2016/004128
§ 371 (c)(1),
(2) Date: Oct. 18, 2017

(87) PCT Pub. No.: WO2016/171473
PCT Pub. Date: Oct. 27, 2016

(65) Prior Publication Data
US 2018/0096155 A1    Apr. 5, 2018

(30) Foreign Application Priority Data
Apr. 21, 2015  (KR) .................. 10-2015-0055749

(51) Int. Cl.
*G06F 21/60* (2013.01)
*G06F 3/12* (2006.01)
(Continued)

(52) U.S. Cl.
CPC .............. *G06F 21/608* (2013.01); *G06F 3/12* (2013.01); *G06F 3/1222* (2013.01);
(Continued)

(58) Field of Classification Search
None
See application file for complete search history.

(56) References Cited

U.S. PATENT DOCUMENTS 7,187,461 B2 * 3/2007 Schlonski ............. G06F 3/1204
358/1.15
9,524,133 B2 * 12/2016 Takano ................. G06F 3/1205
(Continued)

FOREIGN PATENT DOCUMENTS

KR  10-2011-0092516   8/2011
KR  10-2012-0064210   6/2012
(Continued)

*Primary Examiner* — Beniyam Menberu
(74) *Attorney, Agent, or Firm* — Lex IP Meister, PLLC

(57) ABSTRACT

The present invention relates to a cloud-based secure printing system and a method of processing same. When requesting printing of a desired printed matter by using a communication network of a mobile terminal of a user and a personal computer, the cloud-based secure printing system of the present invention uses a print management server and a print agent to authenticate and confirm the user and document security authority, and prints the printed matter through a desired printer. According to the present invention, the effects of strengthening the security of printed matter, increasing user convenience and work efficiency through a mobile printing function, and reducing the printing of unnecessary documents and the leaving of documents unattended and reducing costs can be obtained, and a secure print platform can be provided which is capable of printing, regardless of which printer manufacturer and model is used.

9 Claims, 11 Drawing Sheets

(51) Int. Cl.
  *G06K 15/02* (2006.01)
  *H04W 12/06* (2009.01)
  *H04L 29/06* (2006.01)
  *H04L 29/08* (2006.01)

(52) U.S. Cl.
  CPC ............ *G06F 3/1288* (2013.01); *H04L 63/04* (2013.01); *H04L 63/08* (2013.01); *H04L 67/10* (2013.01); *H04W 12/06* (2013.01)

(56) References Cited

U.S. PATENT DOCUMENTS

| | | | | |
|---|---|---|---|---|
| 2002/0051178 A1* | 5/2002 | Nakayasu | ............. | G06F 3/1204 358/1.15 |
| 2003/0004988 A1* | 1/2003 | Hirasawa | .......... | G06F 17/30265 715/211 |
| 2004/0139326 A1* | 7/2004 | Ootsuka | ................ | G06F 21/606 713/176 |
| 2005/0162691 A1* | 7/2005 | Tsuzuki | ................ | G06F 3/1204 358/1.15 |
| 2012/0092719 A1* | 4/2012 | Jaudon | ................... | G06F 3/1204 358/1.15 |
| 2013/0191903 A1* | 7/2013 | Jaudon | ................... | H04L 63/08 726/7 |
| 2015/0029544 A1* | 1/2015 | Yun | ....................... | G06F 3/1292 358/1.15 |
| 2015/0103373 A1* | 4/2015 | Juchem | ................... | H04L 67/16 358/1.15 |
| 2015/0124290 A1* | 5/2015 | Tajima | ................... | G06Q 10/10 358/1.15 |
| 2015/0142919 A1* | 5/2015 | Lee | ..................... | H04L 67/2814 709/219 |
| 2015/0248258 A1* | 9/2015 | Ding | .................... | G06F 3/1222 358/1.15 |

FOREIGN PATENT DOCUMENTS

| | | |
|---|---|---|
| KR | 10-2014-0056375 | 5/2014 |
| KR | 10-1424661 | 7/2014 |
| KR | 10-2014-0129712 | 11/2014 |
| WO | 2011115987 | 9/2011 |
| WO | 2013048509 | 4/2013 |

\* cited by examiner

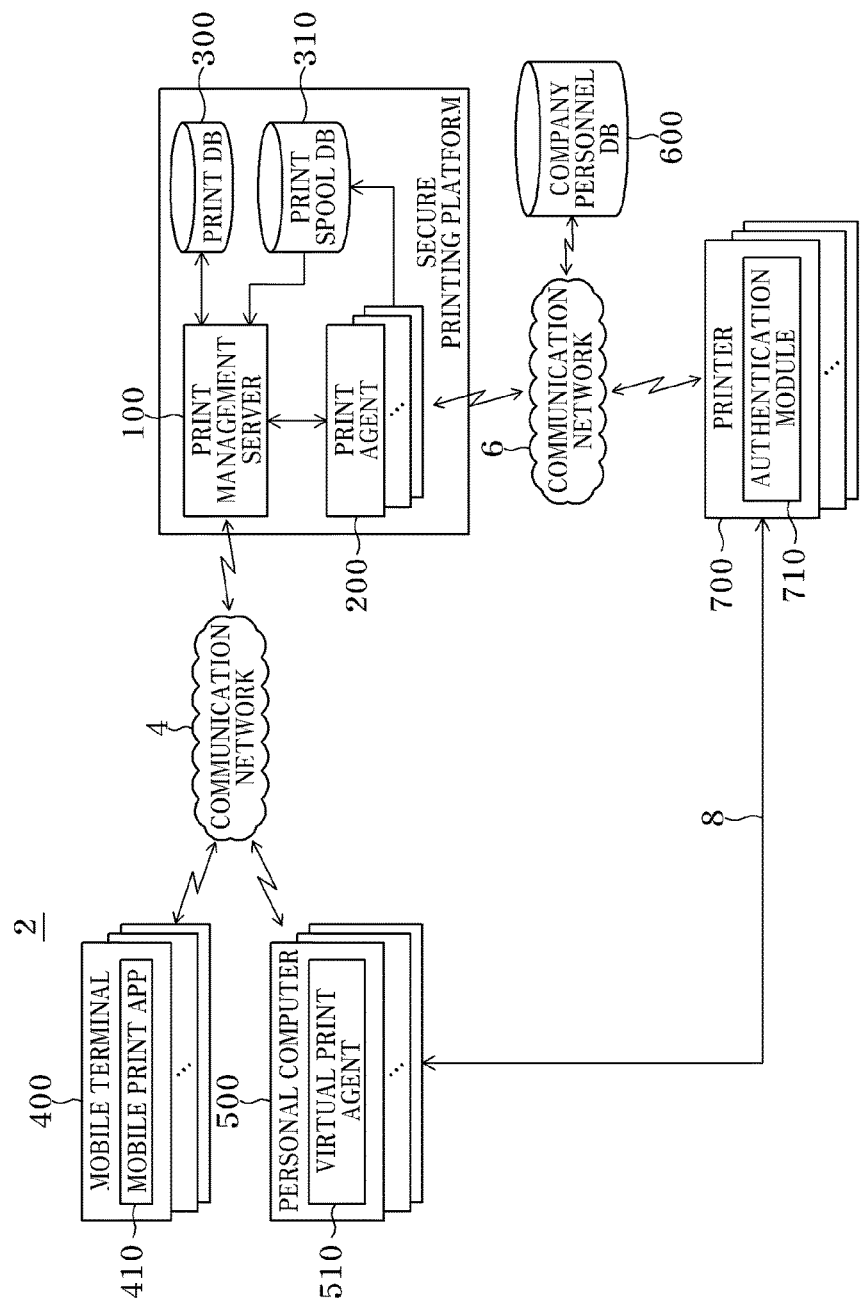
[FIG. 1]

[FIG. 2]
100
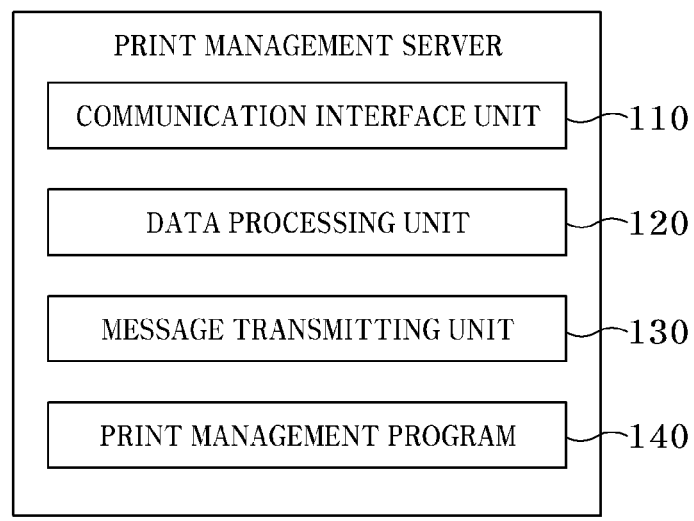

[FIG. 3]
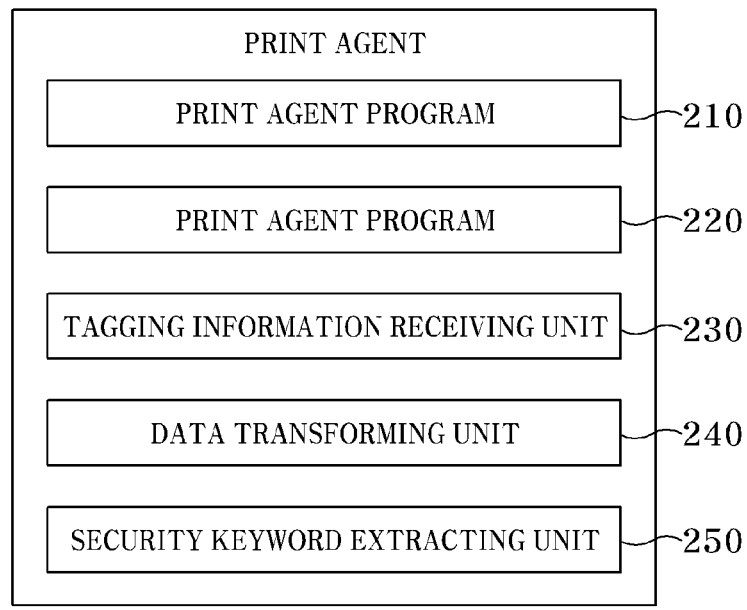

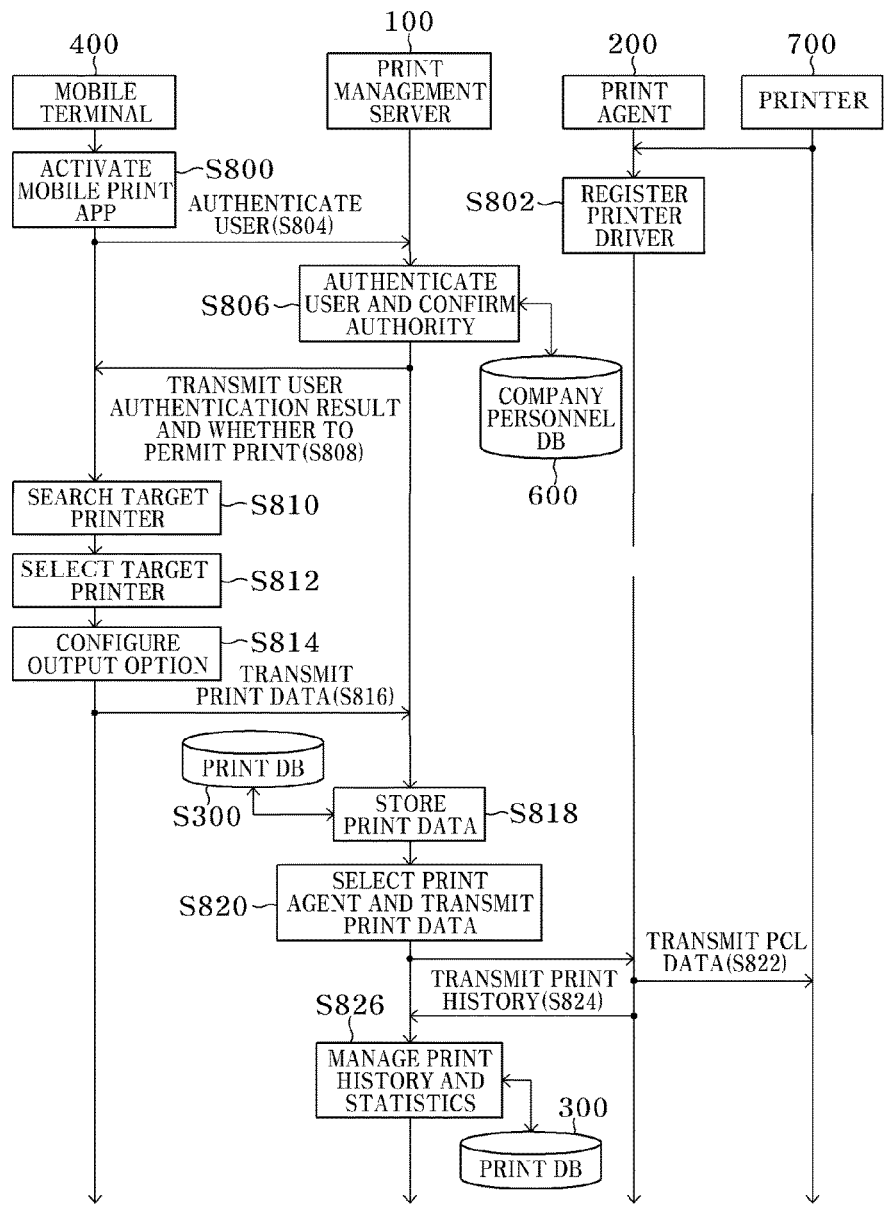

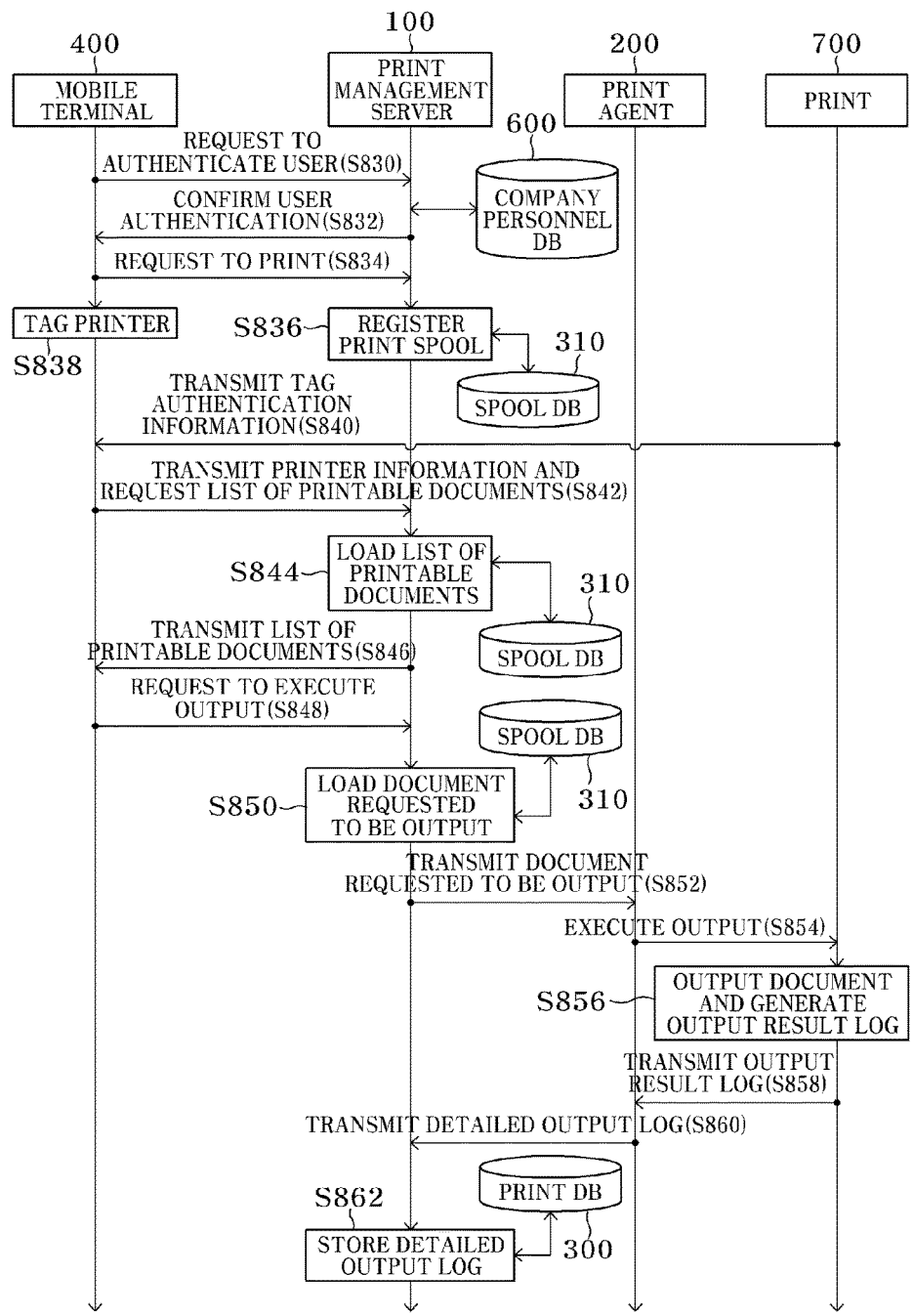
[FIG. 5]

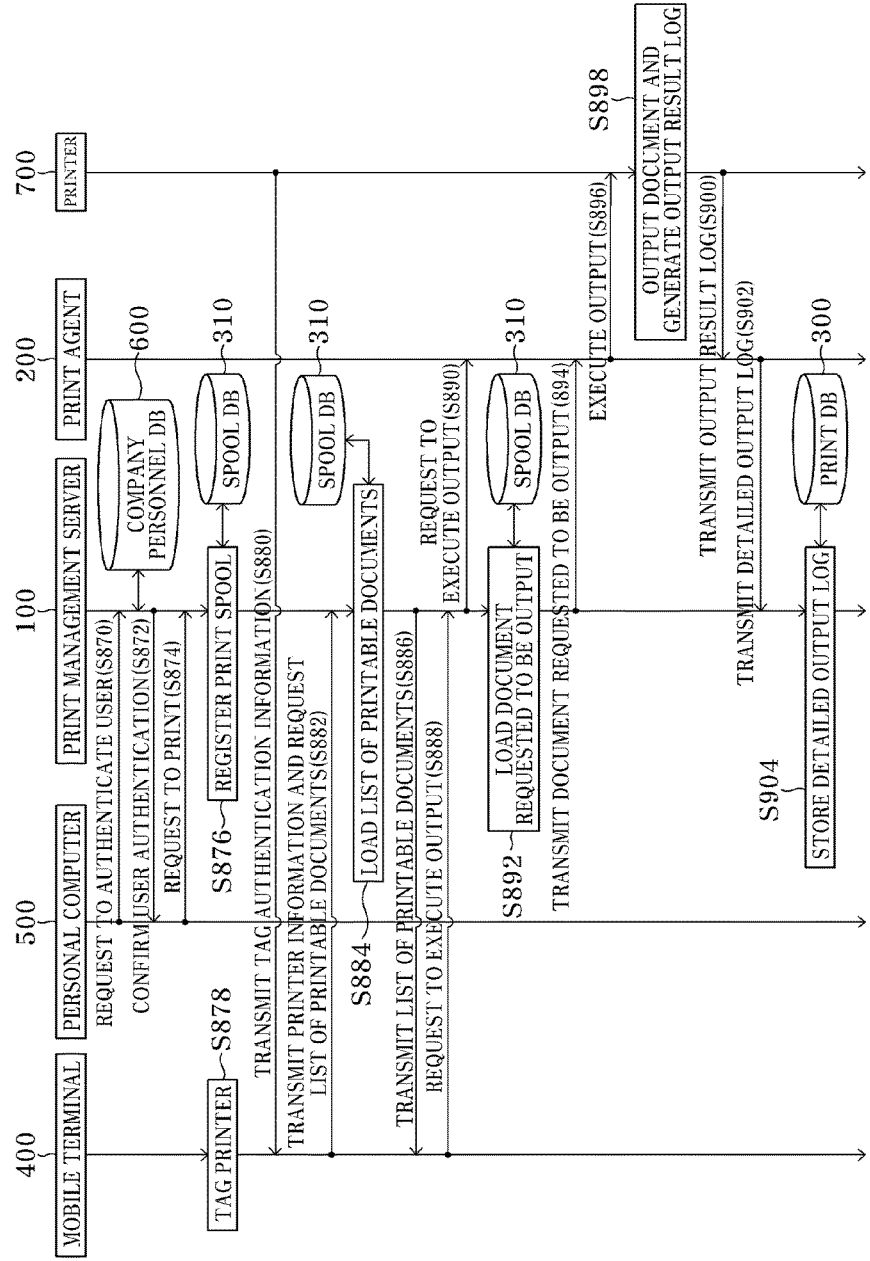

[FIG. 7]
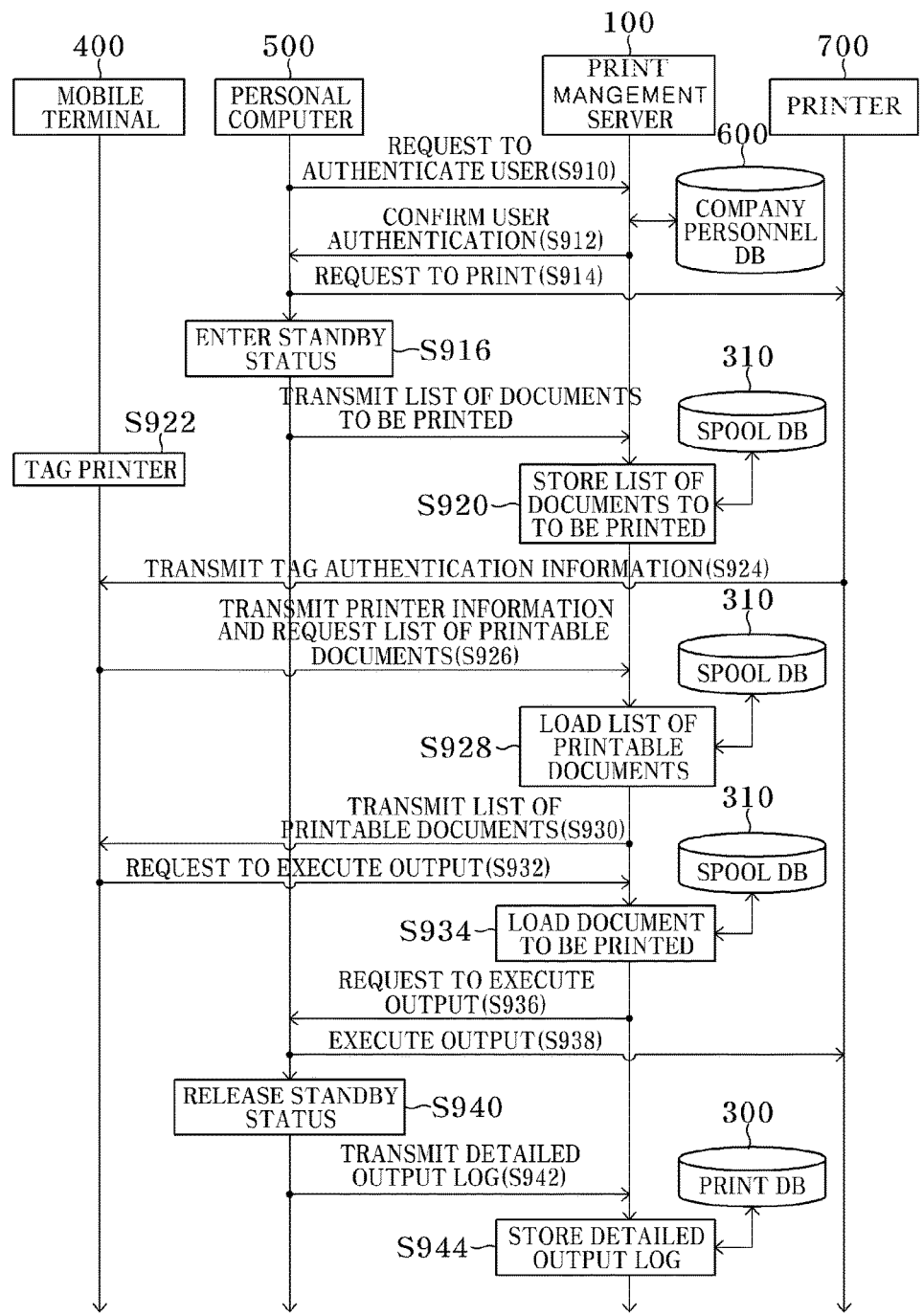

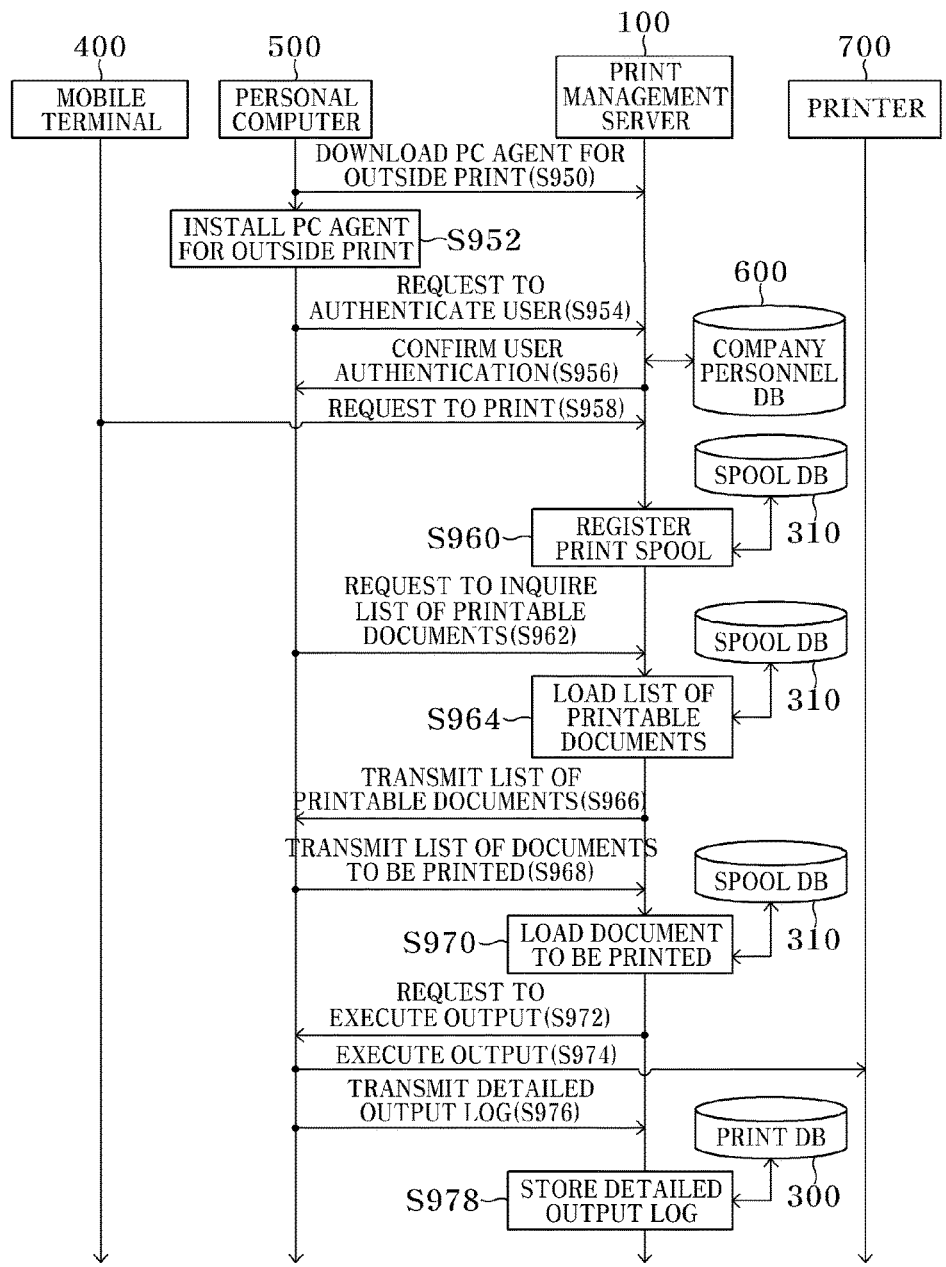
[FIG. 8]

[FIG. 9]
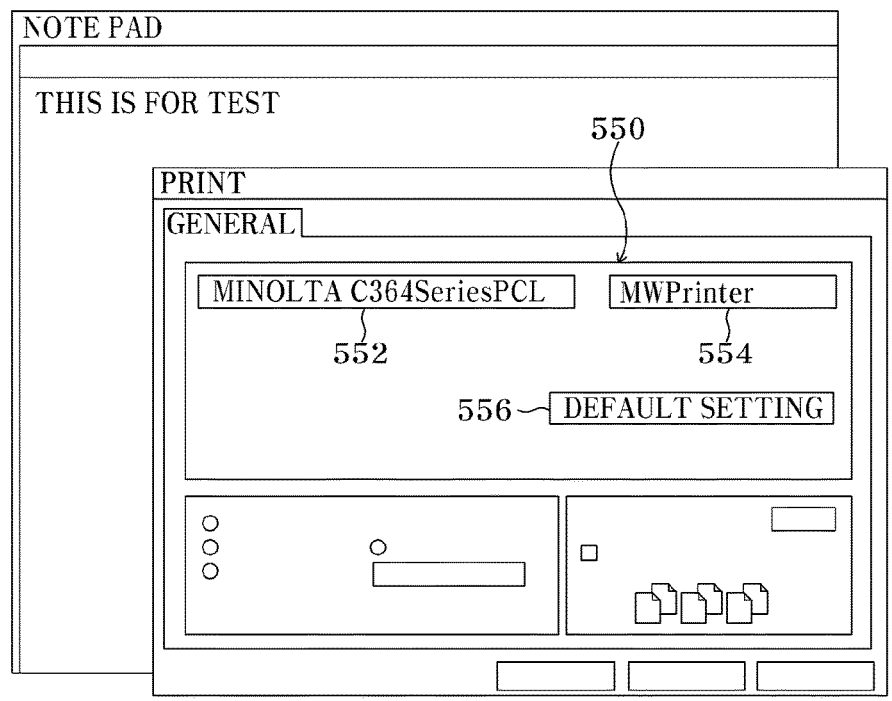

[FIG. 10]
552
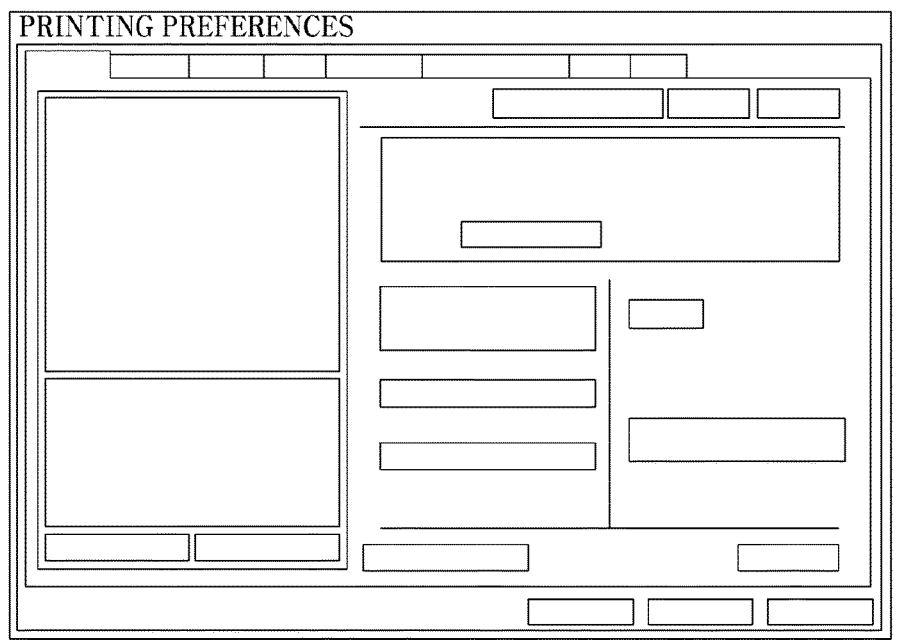

[FIG. 11]
554
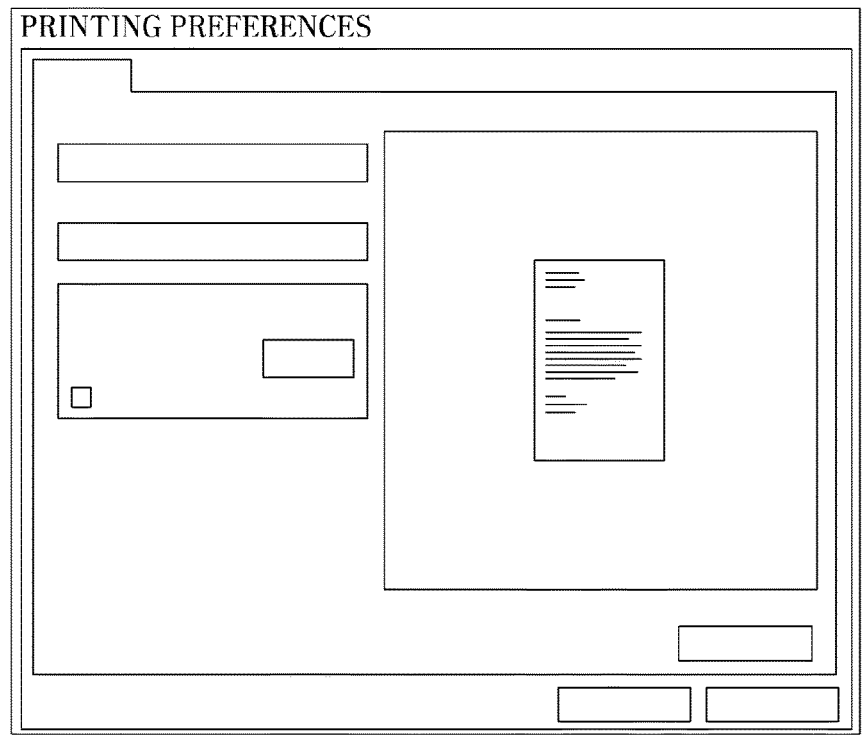

CLOUD-BASED SECURE PRINTING SYSTEM AND METHOD OF PROCESSING SAME

TECHNICAL FIELD

This application claims the priority of Korean Patent Application 10-2015-0055749, filed Apr. 21, 2015, the disclosure of which is incorporated herein by reference in its entirety.

The present invention relates to a cloud-based secure printing system, and more particularly, to a cloud-based secure printing system which is capable of using various types of printers, provides an improved security function, and provides a mobile printing function to allow a user to print regardless of time and places to increase convenience and work efficiency, and reduce the printing of unnecessary documents and the leaving of documents unattended to reduce costs and a method of processing the same.

BACKGROUND ART

Recently, as a replacing cycle is shortened due to a rapid development speed of computer hardware and software, a cloud computing technology which virtualizes a computer environment to allow users to share many resources to reduce a replacement necessity of the hardware and software is attracting attention from users.

The cloud computing is a computing style in which IT related functions are provided as services so that even though users do not have a specialized knowledge for infra structure of a supporting technology or do not know a control method thereof, the users may conveniently use the service from the Internet. The cloud computing uses the Internet to satisfy the computing request of the users and Google Apps is an example thereof.

According to the cloud computing, data of the users is safely stored in a server having a high reliability. Further, if a neglected class of people who does not have a device has a computer shared by the public or a computer connected to the Internet, the neglected class of people may enjoy a personal computing environment. Further, restrictions of equipment which should be carried by the personal user or a storage space disappear.

As such a cloud computing develops, a cloud printing system which shares a printer resource appears. A general cloud printing system includes a user terminal which stores a file to be output and transmits the file through a communication network to request a print service and a print server which receives a request for the print service from the user terminal to provide an output material for the received file.

However, according to such a cloud printing system, when a user wants to print a file stored in the user terminal, the user selects one of a plurality of connectable printers, sends a connection request, and then receives an approval for connection from the print server and the print server requests the file to the user terminal and the user terminal transmits the file to the print server to output the file. In this case, there is a problem in that there is a lack of compatibility due to various user environnrients and different printer models depending on the model of the user terminal and the communication type.

That is, an application module of the terminal needs to be developed in accordance with the internal processing of the user terminal and a related driver module of the printer according to the output needs to be connected to the user terminal to be processed. As described above, for the cloud printing system, various driver modules according to the printer model needs to be developed and various application modules according to the model of the user terminal also needs to be developed. Therefore, it is difficult to commercialize and provide the cloud printing system as a service.

Therefore, there is a demand for a cloud printing system and a method for allowing a user terminal to access various printing environments to output contents so that the user can conveniently print at any time when the user wants.

Further, information security is also important as much as the supporting of a convenient printing environment. When a security document is printed in a network environment of the cloud printing system, the security document is always exposed to a risk in that the information is easily leaked. Therefore, when a document is output using the cloud printing system, there is a demand for a printing method which determines a security level of the document based on contents of the document to determine whether to output the document and provides an authentication system which identifies authenticity of the document to the user terminal or the print server to manage the output of the document, thereby supporting the information security.

Currently, a cloud printing market consistently expands as a mobile printing market in accordance with development of the cloud printing market to a mobile environment. However, a cloud-based mobile printing solution of the related art is mainly formed by printer manufacturers, so that only a restricted printer model is supported. That is, if the mobile printing solution is not provided by the same manufacturing company as the print product, the mobile printing solution cannot be used. Therefore, in order to form a mobile output environment, all the existing printing equipment needs to be replaced so that a cost for purchasing the equipment may be incurred.

DISCLOSURE

Technical Problem

An object of the present invention is to provide a cloud-based secure printing system which provides an improved security function and a processing method thereof.

Another object of the present invention is to provide a cloud-based secure printing system which provides a mobile printing function for allowing printing regardless of time and places to increase convenience and work efficiency and a processing method thereof.

Still another object of the present invention is to provide a cloud-based secure printing system which restricts the unnecessary printing and the leaving of documents unattended to reduce the costs and a processing method thereof.

Still another object of the present invention is to provide a cloud-based secure printing system which provides an open application programming interface implementing a cloud-based secure printing platform to provide an output history when another security operation service is developed in the future and a processing method thereof.

Still another object of the present invention is to provide a cloud-based secure printing system which is compatible to a similar printing service in the future and is interlinked with an existing in-house system and a processing method thereof.

Technical Solution

In order to achieve the above-described objects, the cloud-based secure printing system of the present invention authenticates and confirms the user and a document security authority to output an output matter according to a print request for a desired output matter in a mobile terminal and a personal computer of a user using a communication network. The cloud-based secure printing system of the present invention may provide a secure print platform which is capable of strengthening the security of the output matter, increasing convenience of the user and work efficiency through a mobile printing function, reducing the printing of unnecessary documents and the leaving of documents unattended to reduce costs, and printing regardless of a manufacturer and a model of the printer.

A cloud-based secure printing system of the present invention includes: a communication network; a mobile terminal which is equipped by a user and is connected to the communication network to transmit output data desired to be output; a plurality of printers which is connected to the communication network to be installed in different locations and is driven such that any one is selected according to a print request generated from the mobile terminal through the communication network to print the output data; a print management server which selects one of the printers from the mobile terminal when the mobile terminal requests to print through the communication network, confirms a print authority of the user of the mobile terminal, receives the output data from the mobile terminal to control the selected printer to print the output data, and transmits a print result to the mobile terminal when the print is completed by the selected printer; and at least one print agent which is connected to the communication network to manage the printers, is subject to output scheduling by the print management server, and receives the output data from the print management server to transmit the output data to the selected printer to print the output data.

According to an aspect, the cloud-based secure printing system may further include a personal computer which is equipped by the user and selects one of the printers, and requests the print management server to allow the printer selected by the print agent to perform printing.

According to another aspect, the cloud-based secure printing system may further include; a print database which receives and stores the output data from the print management server and stores user information on a user of the mobile terminal and the personal computers and output history information of the user; and a print spool database which stores spool data corresponding to the output data by the print management server and a list of printable documents including the spool data, loads the list of printable documents to the print management server when at least one of the mobile terminal and the personal computers requests the printing, and provides a desired document to be selected from the list of the printable documents by the mobile terminal and the personal computers.

According to another aspect, the print management server may be interlinked with database which stores and manages user information for confirming an output authority of the user and whether to be permitted to print a document requested to be printed to authenticate and confirm a printing authority for the user of the mobile terminal and the personal computer.

According to another aspect, the printer may include an authentication module for user authentication of the mobile terminal, and the print management server may perform the user authentication for the printer selected by receiving tagging information which is transmitted from the mobile terminal in the authentication module by tagging the printer selected by the mobile terminal to the authentication module.

According to another aspect, the print agent may transform the output data transmitted from the print management server into PCL data and extract text information from the transformed PCL data to inspect whether a security violation keyword is included in an output matter.

According to another aspect, any one of the print management server and the print agents may generate and insert a water mark into the output data to transmit the output data to the printer.

According to another feature of the present invention, there is provided a processing method of a cloud-based secure printing system.

The processing method of a cloud-based secure printing system includes: activating a mobile print application installed therein for a print request by a mobile terminal and installing and registering a print agent driver for a plurality of printers which is connected to the print agent, by the print agent; confirming user authentication by interlinking the print management server with company personnel database when the mobile terminal requests a print management server to authenticate a user and confirming an authority of the user and an authority of a document requested to be printed; transmitting a user authentication result and whether to be permitted to print to the mobile terminal by the print management server, searching and selecting a target printer by the mobile terminal, and configuring an output option; transmitting print data to be output to the print management server by the mobile terminal; selecting the print agent suitable for the printer selected by the mobile terminal and transmitting the print data to the selected print agent, by the print management server; transforming the print data transmitted from the print management server into PCL data, by the print agent, to transmit the transformed PCL data to the selected printer to output the print data; and transmitting print history information to the print management server, by the print agent, when the selected printer completely outputs.

According to an aspect, the processing method may further include: processing user authentication for the selected printer by tagging the authentication module of the selected printer with the mobile terminal when the target printer is selected by the mobile terminal and transmitting the generated tagging information from the mobile terminal to the print management server.

According to another aspect, the processing method may further include a first step of requesting the print management server to print by a personal computer; and in the first step, when the personal computer requests the print management server to authenticate a user, the print management server may be interlinked with the company personnel database to confirm the user authentication and transmit a user authentication result to the personal computer; the personal computer may request to print to transmit a list of documents to be printed to the print management server; the print management server may store the list of documents to be printed, the user of the mobile terminal matching the personal computer may tag the mobile terminal to an authentication module equipped in the print desired by the user to transmit tagging information, which is transmitted from the authentication module of the printer to the mobile terminal, to the print management server and request the print management server the list of printable documents, and the print management server may transmit the list of printable documents to the mobile terminal so that the mobile terminal selects a document desired to be printed from the list of printable documents to request the print management server to execute the output.

According to another aspect, the processing method may further include a second step of requesting the print management server to print by a personal computer located outside the company and in the second step, when the personal computer located outside the company requests the print management server to authenticate a user, the print management server may be interlinked with the company personnel database to confirm the user authentication and transmit an authentication result to the personal computer located outside the company, when the mobile terminal of the user matching the personal computer located outside the company may request the print management server to print, the personal computer may request the print management server to inquire the list of printable documents, the print management server may transmit the list of printable documents to the personal computer located outside the company, the personal computer located outside the company may transmit a document to be printed from the list of printable documents to the print management server, and the print management server may request the personal computer located outside the company to execute to output the document so that the personal computer located outside the company allows a printer connected to a local network outside the company to execute the output.

According to another aspect, in the processing method, when the selected printer and the personal computer of the user are on the same local network, only output security log information is extracted to be transmitted to the print management server.

Advantageous Effects

As described above, the cloud-based secure printing system of the present invention authenticates and confirms the user and a document security authority to output an output matter according to a print request for a desired output matter in a mobile terminal and a personal computer of a user using a communication network. Therefore, the cloud-based secure printing system of the present invention may provide a secure print platform which is capable of strengthening the security of the output matter, increasing convenience of the user and work efficiency through a mobile printing function, reducing the printing of unnecessary documents and the leaving of documents unattended to reduce costs, and printing regardless of a manufacturer and a model of the printer.

The cloud-based secure printing system of the present invention may provide an output history through a secure print platform when another security operation system is developed in the future by developing an open application programming interface (open API) for a secure print platform.

The cloud-based secure printing system of the present invention may be is interlinked with an in-house system such as a company personnel database to provide a cloud-based secure printing service so that an output authority of the user and an authority to print a document requested to be printed is confirmed, to strength a security for a cloud-based printing service.

Further, when a personal computer of the user is directly connected to a printer or is connected on the same local network to directly transmit the output to the printer, the cloud-based secure printing system of the present invention transmits only minimum output security log information to the print management service instead of transmitting document data to the print management server, so that a load of the network and the server may be reduced.

DESCRIPTION OF DRAWINGS

FIG. 1 is a block diagram illustrating a network configuration of a cloud-based secure printing system of a company according to an exemplary embodiment of the present invention.

FIG. 2 is a block diagram illustrating a configuration of a print management server illustrated in FIG. 1.

FIG. 3 is a block diagram illustrating a configuration of a print agent illustrated in FIG. 1.

FIG. 4 is a flowchart illustrating a secure printing process procedure of a cloud-based secure printing system according to the present invention.

FIG. 5 is a flowchart illustrating a mobile printing process procedure according to an exemplary embodiment of the present invention.

FIG. 6 is a flowchart illustrating a personal computer printing process procedure according to an exemplary embodiment of the present invention.

FIG. 7 is a flowchart illustrating a personal computer printing process procedure according to another exemplary embodiment of the present invention.

FIG. 8 is a flowchart illustrating a personal computer printing process procedure according to another exemplary embodiment of the present invention.

FIG. 9 is a view illustrating printer drivers equipped in a printer selecting item at the time of printing in a personal computer according to the present invention.

FIG. 10 is a view illustrating a print option of a specific printer driver illustrated in FIG. 9.

FIG. 11 is a view illustrating a print option of a virtual printer driver illustrated in FIG. 9.

BEST MODE

Exemplary embodiments of the present invention may be modified in various forms, and the scope of the present invention is not interpreted as being limited to the exemplary embodiments below described in detail. The Examples of the present invention are provided for more completely explaining the present invention to those skilled in the art. Therefore, shapes of elements in the drawings may be enlarged in order to emphasize a more clear description.

Hereinafter, the exemplary embodiment of the present invention will be described in detail with reference to FIGS. 1 to 11.

FIG. 1 is a block diagram illustrating a network configuration of a cloud-based secure printing system of a company according to an exemplary embodiment of the present invention, FIG. 2 is a block diagram illustrating a configuration of a print management server illustrated in FIG. 1, and FIG. 3 is a block diagram illustrating a configuration of a print agent illustrated in FIG. 1.

First, referring to FIG. 1, a cloud-based secure printing system 2 of the present invention provides secure print platforms 100, 200, 300, and 310 which strength a security to allow a mobile terminal 400 of a user who wants to receive a secure printing service based on a cloud and a personal computer 500 equipped inside or outside a company to output a desired output matter in accordance with the user or a document security for the desired output matter through the communication networks 4, 6 and increases convenience and work efficiency of the user through a mobile printing function, and restricting the printing of unnecessary documents and leaving of documents unattended to reduce costs, and allow the printing regardless of a manufacturer and a model of the printer 700.

Further, the cloud-based secure printing system 2 of the present invention develops an open application programming interface (Open API) for the secure print platforms 100, 200, 300, 310 to provide an output history when other security operation system is developed in the future.

Further, the cloud-based secure printing system 2 of the present invention is interlinked with an in-house system such as a company personnel database 600 to provide a cloud-based secure printing service.

To this end, the cloud-based secure printing system 2 of the present invention includes communication networks 4, 6, and 8, a plurality of mobile terminals 400, a plurality of personal computers 500, a plurality of printers 700, a print management server 100, and a plurality of print agents 200. Further, the cloud-based secure printing system 2 of the present invention incudes a print database Print DB 300, a print spool database 310, and a company personnel database 600.

The communication networks 4, 6, and 8 are equipped as a wired/wireless communication network, a mobile communication network, a local network, and the like, and include a public network, a DMZ network, and a private network. The communication networks 4, 6, and 8 are equipped as a single communication network or a complex communication network which allows data communication between the mobile terminals 400, the personal computers 500, the printers 700, the print management server 100, the print agents 200, and the company personnel database 600.

A plurality of printers 700 is connected to the communication networks 4, 6, and 8 in different locations and is driven to output an output matter by the personal computer 500 which is connected directly or on the same local network through the communication networks 4, 6, and 8 in accordance with all print requests or driven by at least one print agent 200. In this case, when the printer 700 is directly connected to the personal computer 500, the communication network 8 may include a serial communication network such as an USB or a wireless LAN such as WiFi, for example.

In this exemplary embodiment, the printers 700 are equipped in different locations of one company. For example, the plurality of printers is equipped in a head office of the company and a plurality of branches. The printers 700 may be the same or different models, that is, may be provided by various manufacturers or as various products.

Further, the printer 700 includes an authentication module 710 to authenticate a user for the printer to which the mobile terminal 400 of a user who wants to output tags. In this exemplary embodiment, the authentication module 710 is equipped as an NFC tag or a Bluetooth beacon which is recognized by the mobile terminal 400.

The company personnel database 600 is equipped in an in-house system (not illustrated) of the company. When there is a print request from the mobile terminal 400 or the personal computer 500, user information for confirming an output authority for the user and whether to be permitted to print the print requested document, for example, employee information is stored. The company personnel database 600 is interlinked with a secure printing platform, that is, the print management server 100 and the print agent 200 so as to provide user information to authenticate the authority of the user who requests the printing.

The mobile terminal 400 is equipped by the user as a smart phone or a tablet computer and is connected to the print management server 100 through a communication network 4, for example, a wireless communication network or a mobile communication network. The mobile terminal 400 accesses the print management server 100, an application market (not illustrated) or a web page (not illustrated) which provides a secure printing service of the present invention through the communication network 4 to download a mobile print application (hereinafter, referred to as a mobile print app) 410 and install the mobile print app therein.

The mobile terminal 400 selects a printer 700 in a location which is desired by the user using the mobile print app 410 and requests to print by the printer 700 selected by the print agent 200 connected to the printer 700 which is selected by the control of the print management server 100. Further, the mobile terminal 400 selects an output matter to be output in the same way as the personal computer 500 and designates a print option such as a both-sided printing, divided printing, or a preview to enable the printing.

Further, when there is the print request from the mobile terminal 400 and the personal computer 500, the mobile terminal 400 tags the printer 700 desired by the user through the authentication module 710 such as the NFC tag or the beacon of the printer 700 before outputting, to perform the user authentication for the printer 700.

Here, the authentication module 710 tags the mobile terminal 400 to the NFC tag or the Bluetooth beacon attached onto the printer 700 by the user of the mobile terminal 400 and the personal computer 500 to perform the user authentication for the printer 700. In this case, the mobile terminal 400 of the user receives tagging information (for example, printer information) from the authentication module 710 through the mobile print app 410 and transmits the tagging information to the print management server 100. Further, the mobile terminal 400 is interlinked with the personal computer 500 located outside the company to provide the outside printing function to enable the print request for a document desired from the outside.

The personal computer 500 is equipped by the user and selects a printer 700 in a location where the user wants to print and is controlled by the print management server 100 to request the printer 700 selected by the print agent 200 to perform the printing. The personal computer 500 matches the mobile terminal 400 to perform user authentication. The personal computer 500 is directly connected to a specific printer 700 through a serial communication network such as the same local network or the USB or a wireless LAN or equipped inside or outside the company to be connected through the communication networks 4 and 6.

Further, the personal computer 500 is equipped with a virtual print agent 510 which is provided as a computer program therein. The virtual print agent 510 is installed in the personal computer 500 and selects a printer 700 in a location where the printing is desired and manages to perform the printing by the selected printer 700. To this end, the virtual print agent 510 requests the print management server 100 to print. Further, the virtual print agent 510 hooks events of the printer drivers installed in the personal computer 500 to manage not to perform the printing for a print request which does not pass through the printer management server 100.

Further, the personal computer 500 selects the printer 700 desired to output, through the virtual print agent 510, similarly to the mobile terminal 400, and selects an output matter to be output and designates the print option such as both sided printing, divided printing, or a preview to enable the printing. Further, the personal computer 500 provides an output information confirming function which confirms a printing process for a situation that the printing is performed and an outside printing function which enables the print request from the outside.

Therefore, the mobile print app 410 and the virtual print agent 510 are installed in each of the mobile terminal 400 and the personal computer 500. The mobile print app 410 of the mobile terminal 400 transmits a document file to be printed as it is to the print management server 100 and the virtual print agent 510 installed in the personal computer 500 transmits the document file as it is to the printer management server 100 or transforms the document file into printer control language (PCL) data to transmit the transformed PCL data.

To this end, when the virtual print agent 510 is installed, in the personal computer 500, the virtual printer driver for providing the cloud-based secure printing service according to the present invention is generated to be installed. By doing this, when the printing is performed in a program which requests to output a document, for example, a program such as MS word, the virtual print driver is selected to print. Further, when the personal computer 500 selects the virtual printer driver in MS word, the PLC data is transmitted to the virtual print agent 510. In this case, the PCL data is transmitted to the print management server 100.

For example, when the printing is performed, a program such as MS word or Hangul calls a graphics device interface (GDI) print API of a window operating system to perform the print job. Therefore, the virtual print agent 510 hooks the GDI print API to automatically intervene at the time when the programs call a print starting API. When the user is not permitted to print, the virtual print agent calls a print cancelling API for the print job to cancel the printing.

Further, the virtual print agent 510 periodically receives and synchronizes user information from the print management server 100 to confirm a printing policy such as the authority of the user through the user authentication process. Here, the printing policy may be diversely set for every user, every department, every date, or every program. Further, when the virtual print agent 510 is installed at first, no program can perform the print job. That is, the virtual print agent 510 performs the user authentication process to permit or cancel the printing according to the printing policy assigned to the user.

The print management server 100 is interlinked with a group ware including the company personnel database 600 of the company and a document security system (not illustrated), that is, the in-house system to confirm the document authority of the user who requests the printing in the mobile terminal 400 or the personal computer 500. In this case, the print management server 100 confirms and manages the document authority of the user for every user and every department of the company.

After confirming the document authority of the user, the print management server 100 selects an appropriate print agent 200 to request the print agent 200 to output the document. In this case, the print management server 100 confirms the printer 700 requested to print by the user and a print option of the printer 700 through the print agent 200 and inserts a watermark for security to request to output a document.

Further, when the printing is completed in the printer 700, the print management server 100 receives information on a printing result from the print agent 200 and stores the user information and output history information in the print database 300. In this case, the print management server 100 transmits information on the printability and the printing result (for example, a push message, a notice message, or the like) to the mobile terminal 400 or the personal computer 500.

Further, the print management server 100 generates statistical data for the user information and the output history information to provide the statistical data to the user or a manager of the mobile terminal 400 or the personal computer 500. Further, the print management server 100 generates data for every user or every document to perform a general output matter security management function such as output history management.

Further, the print management server 100 performs new registration, deletion, modification, and status management of the print agent 200 and output scheduling management of each of the print agents 200. Further, the print management server 100 manages the operation status of the plurality of print agents 200 and printers 700 registered in each of the print agents 200. Further, the print management server 100 adds and deletes the printer to a list of the entire printers 700 connected to the print agents 200 and manages the status thereof. Further, when another security operation service is developed in the future, the print management server 100 provides output history information through the open API.

When the mobile terminal 400 or the personal computer 500 requests the printing, the print management server 100 receives user information who requests the printing and document information from the mobile terminal 400 or the personal computer 500. In this case, in order to confirm the document authority of the user, the print management server 100 is synchronized with the company personnel database 600 to confirm the user information and the output authority of the user and printability of the document therethrough. Next, the print management server 100 selects the print agent 200 suitable for the print request and requests the selected print agent 200 to output a document so that the corresponding printer 700 outputs the document.

Specifically, referring to FIG. 2, the print management server 100 of the present exemplary embodiment includes a communication interface unit 110, a data processing unit 120, a message transmitting unit 130, and a storage unit (not illustrated) which stores a print management program 140.

The communication interface unit 110 performs data transmission with the mobile terminal 400 and the personal computer 500. The communication interface unit 110 receives data to be printed from a mobile print app 410 of the mobile terminal 400 and receives data to be printed from the virtual print agent 510 of the personal computer 500. Further, the communication interface unit 110 receives information on the printability and the print result from the message transmitting unit 130 to transmit the information to the mobile terminal 400 and the personal computer 500.

The data processing unit 120 controls the communication interface unit 110 and the message transmitting unit 130 and processes the print management program 140 to control an overall operation of the print management server 100. The data processing unit 120 stores a document file or PCL data, which is transmitted from the mobile terminal 400 or the personal computer 500, in the print database 300. The message transmitting unit 130 is controlled by the data processing unit 120 to transmit a push message or a notice message for the print result to the mobile terminal 400 and the personal computer 500 according to a secure print process. Further, the print management program 140 is controlled by the data processing unit 120 to process the overall operations and functions of the print management server 100.

When such a print management server 100 is ready to output the document file or the PCL data received from the mobile terminal 400 and the personal computer 500 through the communication interface unit 110, the print management server 100 transmits a printable status message to the mobile terminal 400 and the personal computer 500 through the message transmitting unit 130.

Further, when the user of the mobile terminal 400 and the personal computer 500 moves to the desired printer 700 to tag the mobile terminal 400 to the authentication module 710 to perform user authentication, the print management server 100 receives the printer information tagged by the mobile terminal 400 and selects the print agent 200 to select a printer 700 to print.

Further, the print management server 100 controls the print agent 200 to perform an output job of the printing. That is, the print management server 100 selects the print agent 200 suitable for the tagging information and controls the output job to be performed in the specific printer 700 connected to the selected print agent 200.

Further, the print management server 100 supports a direct print type printing function. The direct print type is a function used to perform the printing using an arbitrary printer 700 located outside the company through the print management server 100. That is, according to the direct print type, first, a virtual print agent 510 for outside print is installed in an arbitrary personal computer 500 connected to the outside printer 700 and an ID and a password of the user are input using the virtual print agent to perform the user authentication process.

Thereafter, the user may perform the printing in the mobile terminal 400 according to the existing manner In this case, when the print management server 100 is ready to transmit the print data to the print agent 200, the virtual print agent 510 for outside print inquires the list of documents that can be output from the printer management server 100 and selects a document to be output to perform the printing. Details thereof will be specifically described with reference to FIG. 8.

The print management server 100 authenticates the user, outputs a security document, manages the output history and statistics, and processes an output scheduling of the print agent 200.

Referring to FIG. 1 again, the print database 300 stores user information on the user of the mobile terminal 400 and the personal computers 500 and output history information of the user. In this case, the user information is interlinked with the user information of the company personnel database 600. Further, the print database 300 is transmitted from the mobile terminal 400 and the personal computer 500 through the print management server 100 and stores various types of data whose print authority is assigned for every user and every department.

The print spool database 310 stores spool data and a list of printable documents including the spool data by the print management server 100. When there is a print request from the mobile terminal 400 and the personal computers 500, the print spool database 310 loads the list of printable documents to the print management server 100 to provide the list to the mobile terminal 400 and the personal computers 500 so that the mobile terminal 400 and the personal computers 500 select a desired document from the list of printable documents.

Further, a plurality of print agents 200 is equipped to be connected to the print management server 100 and a plurality of printers 700 is connected to each of the print agents 200 directly or through the communication network 6. The print agent 200 is equipped as a typical computer server. Each of the print agents 200 is equipped with a print agent driver (220 in FIG. 3) which drives respectively the plurality of printers 700 connected thereto.

When the print request is sent from the mobile terminal 400 and the personal computer 500 to the print management server 100, the print agent 200 is controlled by the print management server 100 to provide an output matter security management function to request the printer 700 which is connected directly or through the communication network 6 to print and generate a water mark including information on a user who requests the printing to insert the water mark into pages of all documents to be printed or transmit an output security log to the print management server 100. In this case, the print agent 200 transmits a document into which the water mark is inserted to the printer 700. Further, when the printing is completed in the printer 700, the print agent 200 transmits information on the printing result to the print management server 100.

Specifically, referring to FIG. 3, the print agent 200 of the present exemplary embodiment includes a storage unit (not illustrated) which stores the print agent program 210, a print agent driver 220, a tagging information receiving unit 230, a data transforming unit 240, and a security keyword extracting unit 250.

The print agent program 210 is installed in the print agent 200 and processes the overall operations and functions of the print agent 200. The print agent driver 220 is equipped as a virtual print driver which is driven to output using the printers 700 connected to the print agent 200. The tagging information receiving unit 230 receives tagging information for user authentication for the printer 700 from the mobile terminal 400. The data transforming unit 240 receives a document file or output data from the printer management server 100 to transform the document file or the output data into PCL data to output the PCL data to the printer 700. Further, the security keyword extracting unit 250 extracts text information for inspecting whether a security violation keyword for the output matter is included, from the PCL data transformed by the data transforming unit 240.

Such a print agent 200 performs an output job using the document file or the PCL data and tagging information transmitted from the print management server 100 and the mobile terminal 400. To this end, a plurality of print agent drivers 220 for driving various printers 700 connected thereto is installed in the print agent 200.

Therefore, the print agent program 210 and the printer agent drivers 220 of all the output target printers 700 are installed in the print agent 200. The printer agent driver 220 is installed by a manager at the first time when a new printer is registered in the print agent 200. The print agent program 210 drives the print agent driver 220 to print in the corresponding printer 700.

Further, when the user transmits the document file as it is to the print management server 100 to print the document file, the print agent program 220 transforms the document file into the PCL data through the data transforming unit 240.

Further, the print agent 200 finally transforms data for all print requests into the PCL data and extracts only text information from the transformed PCL data to inspect whether the security violation keyword is included in the output matter. When the security keyword violation occurs, the print agent stops outputting the entire document or a part of the document. Here, among data, text information included in image information is extracted using an OCR engine (that is, an image character recognizing engine) and whether the security violation keyword is included in the output matter is inspected. Further, the text information which is not included in the image information is extracted without using the OCR engine, that is, the image character recognizing engine to inspect whether the security violation keyword is included in the output matter. In this case, the security keyword is equipped to enable a pattern search and a manager registers a security word such as a phrase formed of a resident registration number in the keyword extracting unit 250.

Further, when the personal computer 500 requests the printing, the print agent 200 needs to designate the print agent driver 220 to perform the printing. However, even when the personal computer 500 and the printer 700 are connected to the same local network 8, the print agent 200 may output to all printers 700 equipped in the company. In this case, the personal computer 500 transmits the PCL data to the virtual print agent 510 and the PCL data is transmitted to the print management server 100 through the virtual print agent 510.

Therefore, the printing in most of the personal computers 500 is transmitted to the print management server 100 in form of PCL data. Here, a file format which can be transformed into the PCL data by the print agent 200 may include various types of files, for example, image files such as BMP, JPG, JPEG, GIF and PNG, text files such as PDF and HWP, or office files such as TXT, RTF, DOC, DOCX, XLS, XLSX, PPT, PPTX, PUB, and VSS. Of course, the file format which can be transformed into PCL data by the print agent 200 may be a file format that can be output by a printer other than the above-described file formats.

Further, the virtual print agent 510 may provide a function of selecting only the file to perform the printing without using the program such as the MS word. Such a function may be used when there is no program for a document to be output, but it is desired to output the document. That is, even though there is no program such as MS word in the personal computer 500, when it is desired to output the word (DOC) document in the printer management server 100, the function may be used.

Further, such a virtual print agent 510 provides a simple user interface UI through a tray icon of the personal computer 500 to allow the user to specify the file to print.

Accordingly, the cloud-based secure printing system 2 of the present invention transmits a document desired to be printed in the mobile terminal 400 and the personal computer 500 to the print management server 100 to be stored in the print database 300 and transmits a document to be output to a print agent 200 suitable for the printer 700 desired to print the document in the print management server 100 to provide the secure print service to various printers 700 regardless of the printer manufacturer and model.

The cloud-based secure printing system 2 of the present invention supports to print various types of files, for example, image files such as BMP, JPG, JPEG, GIF and PNG, text files such as PDF and HWP, or office files such as TXT, RTF, DOC, DOCX, XLS, XLSX, PPT, PPTX, PUB, and VSS.

Further, the cloud-based secure printing system 2 of the present invention provides an executive-specific function so that when an authority of a user who requests the printing is confirmed, if the user is an executive of the company, the cloud-based secure printing system processes to immediately print in the printer 700 without performing a separate user authentication process using the authentication module 710 of the printer 700 and transmit the output history information (for example, the output security log) to the print management server 100 to be stored in the print database 300.

Further, in the present invention, all the printing is basically performed by the print management server 100. In this case, the print management server 100 performs the function of generating PCL data or inserting a water mark. However, when the printing is requested from the personal computer 500 and the personal computer 500 of the user and the printer 700 to output the document are connected to the same local network 8, if the print data is transmitted to the print management server 100 and then transmitted to the printer 700 again, problems may be incurred in terms of the processing speed and unnecessary network traffic.

In order to solve the above-described problems, when the output is performed with respect to the printer 700 on the local network, the virtual print agent 510 directly performs the output job on the printer 700 without passing through the print management server 100. Only in this case, the virtual print agent 510 directly performs the function of generating the PCL data and inserting the water mark and transmits only minimum data to the print management server 100 to leave the output log information.

Continuously, processes of the cloud-based secure printing system of the present invention will be described in detail with reference to FIGS. 4 to 11.

FIG. 4 is a flowchart illustrating a secure printing process procedure of a cloud-based secure printing system according to the present invention.

Referring to FIG. 4, in the cloud-based secure printing system 2 of the present invention, the mobile terminal 400 activates a mobile print app for a print request in step S800 and the print agent 200 installs and registers a print agent driver 220 for a plurality of printers 700 connected to the print agent 200 in step S802.

The mobile terminal 400 requests the print management server 100 to authenticate the user in step S804. In step S806, the print management server 100 is interlinked with the company personnel database 600 to confirm the user authentication and confirm the authority of the user and the authority of the document requested to be printed. In step S808, the print management server 100 transmits the result of the user authentication result and whether to permit the print to the mobile terminal 400.

The mobile terminal 400 searches for a target printer in step S810 and selects the target printer in step S812. In step S814, the mobile terminal 400 configures an output option. In this case, the output option includes both-sided printing, divided printing, and preview printing.

In step S816, the mobile terminal 400 transmits print data to be output to the print management server 100. In step S818, the print management server 100 stores the transmitted print data in the print database 300.

In step S820, the print management server 100 selects a print agent 200 suitable for the printer 700 selected by the user and transmits print data to the selected print agent 200.

The print agent 200 transforms the print data transmitted from the print management server 100 into PCL data and transmits the PCL data to the corresponding printer in step S822 and transmits print history information to the print management server 100 in step S824. Next, in step S826, the print management server 100 stores the print history information in the print database 300 and generates statistical information on the print history information to register, store, and manage the statistical information in the print database 300.

Specifically, the printing process of the present invention will be described using various exemplary embodiments of FIGS. 5 to 8.

FIG. 5 is a flowchart illustrating a mobile printing process procedure according to an exemplary embodiment of the present invention. The exemplary embodiment describes a process of processing a secure printing service using a mobile print app 410 in the mobile terminal 400.

Referring to FIG. 5, in the cloud-based secure printing system 2 of the present exemplary embodiment, when the user authentication is requested from the mobile terminal 400 to the print management server 100 in step S830, the print management server 100 is interlinked with the company personnel database 600 to confirm the user authentication and transmit the authentication result to the mobile terminal 400 in step S832. The user authentication in the present exemplary embodiment is performed using single sign on (SSO) authentication method according to the in-house system of the company.

In step S834, the mobile terminal 400 requests the print management server 100 to print. In step S836, the print management server 100 registers print spool data in a print spool database 310.

When the user of the mobile terminal 400 tags the mobile terminal 400 to an authentication module 710 equipped in a printer 700 desired by the user in step S838, the authentication module 710 of the corresponding printer 700 transmits tag authentication information to the mobile terminal 400 in step S840. In this case, the tag authentication information is transmitted from the authentication module 710 of the printer 700, for example, an NFC tag or a Bluetooth beacon.

In step S842, the mobile terminal 400 transmits printer information on the printer 700 which transmits the tag authentication information to the print management server 100 and requests a list of printable documents, simultaneously. When the list of printable documents is requested by the mobile terminal 400, the print management server 100 brings the list of printable documents from the print spool database 310 to load the list in step S844.

In step S846, the print management server 100 transmits the list of printable documents to the mobile terminal 400. In step S848, the mobile terminal 400 selects a document desired to be printed from the list of printable documents to request the print management server 100 to execute the output. In step S850, the print management server 100 brings the document which is requested to be output from the print spool database 310 to load the document.

In step S852, the print management server 100 transmits the document requested to be output to the print agent 200 suitable for the printer information. In step S854, the print agent 200 transmits the document requested to be output to the printer 700 corresponding to the printer information to execute the output.

The printer 700 outputs the document and generates log information in accordance with the output result in step S856 and transmits output result log information to the print agent 200 in step S858.

In step S860, the print agent 200 receives the transmitted output result log information to transmit detailed output log information to the print management server 100. Next, in step S862, the print management server 100 stores the detailed output log information in the print database 300.

FIG. 6 is a flowchart illustrating a personal computer printing process procedure according to an exemplary embodiment of the present invention. The exemplary embodiment describes a process of processing a secure printing service using a virtual print agent 510 in the personal computer 500.

Referring to FIG. 6, in the cloud-based secure printing system 2 of the present exemplary embodiment, when the user authentication is requested from the personal computer 500 to the print management server 100 in step S870, the print management server 100 is interlinked with the company personnel database 600 to confirm the user authentication and transmits the authentication result to the personal computer 500 in step S872.

When the personal computer 500 requests the print management server 100 to print in step S874, the print management server 100 registers the print spool data in the print spool database 310 in step S876.

In this case, a user of the mobile terminal 400 tags the mobile terminal 400 to the authentication module 710 equipped in a printer 700 desired by the user in step S878. In step S880, the tag authentication information is transmitted from the authentication module 710 of the printer 700 to the mobile terminal 400.

In step S882, the mobile terminal 400 transmits the printer information to the print management server 100 and requests the list of printable documents. The print management server 100 loads the list of printable documents from the print spool database 310 in step S884 and transmits the list of printable documents to the mobile terminal 400 in step S886.

When the mobile terminal 400 selects a document desired to be printed from the list of printable documents to request the print management server 100 to execute the output in step S888, the print management server 100 requests the print agent 200 to execute to output the document in step S890.

The print management server 100 loads the document requested to be output from the print spool database 310 in step S892 to transmit the document requested to be output to the print agent 200 in step S894.

The print agent 200 causes the tagged printer 700 to execute the output in step S896 and the printer 700 completely outputs the document and generates the output result log information in step S898. In step S900, the printer 700 transmits the output result log information to the print agent 200.

When the print agent 200 transmits the output result log information to the print management server 100 in step S902, the print management server 100 stores the output result log information in the print database 300 in step S904.

FIG. 7 is a flowchart illustrating a personal computer printing process procedure according to another exemplary embodiment of the present invention. The exemplary embodiment describes a process of processing a secure print service using a virtual print agent 510 in the personal computer 500. When the printer 700 to print is a local printer, the load of the print management server 100 may be distributed.

Referring to FIG. 7, in the cloud-based secure printing system 2 of the present exemplary embodiment, when the personal computer 500 requests the print management server 100 to authenticate the user in step S910, the print management server 100 is interlinked with the company personnel database 600 to confirm the user authentication and transmits the authentication result to the personal computer 500 in step S912.

The personal computer 500 requests the printer 700 to print in step S914 and enters a standby state in step S916. In this case, in step S916, the personal computer 500 transmits a list of documents to be printed to the print management server 100.

In step S920, the print management server 100 stores the list of documents to be printed to the print spool database 310.

The user of the mobile terminal 400 which matches the personal computer 500 tags the mobile terminal 400 to an authentication module 710 equipped in a printer 700 desired by the user in step S922 to receive tag authentication information from the authentication module 710 of the corresponding printer 700 to the mobile terminal 400 in step S924.

In step S926, the mobile terminal 400 transmits the printer information to the print management server 100 and requests the list of printable documents. The print management server 100 loads the list of printable documents from the print spool database 310 in step S928 and transmits the list of printable documents to the mobile terminal 400 in step S930.

When the mobile terminal 400 selects a document desired to be printed from the list of printable documents to request the print management server 100 to execute the output in step S932, the print management server 100 loads the list of documents to be printed from the print spool database 310 in step S934.

In step S936, the print management server 100 requests the personal computer 500 to execute to output the corresponding document. In step S938, the personal computer 500 causes the printer 700 connected to the local network to execute the output. In this case, the personal computer 500 releases the standby state in step S940 and transmits the detailed output log information to the print management server in step S942. When the print is completed in the printer 700, the personal computer 500 receives the output result log information from the printer 700 and generates the detailed output log information to transmit the detailed output log information to the print management server 100. Next, in step S944, the print management server 100 stores the detailed output log information in the print database 300.

FIG. 8 is a flowchart illustrating a personal computer printing process procedure according to another exemplary embodiment of the present invention. The exemplary embodiment describes a process of processing a secure print service using a virtual print agent 510 for outside print in a personal computer 500 located outside the company. In this exemplary embodiment, similarly to FIG. 7, the printer 700 to print is a local printer.

Referring to FIG. 8, in the cloud-based secure printing system 2 of the exemplary embodiment, a personal computer 500 located outside the company downloads a virtual print agent 510 for outside print from the print management server 100 in step S950 and installs the virtual print agent therein in step S952.

When the personal computer 500 requests the print management server 100 to authenticate the user using the installed virtual print agent 510 for outside print in step S954, the print management server 100 is interlinked with the company personnel database 600 to confirm the user authentication and transmit the authentication result to the personal computer 500 in step S956.

When the printing is requested from the mobile terminal 400 of the user which matches the personal computer 500 located outside the company to the printer management server 100 in step S958, the print management server 100 registers and stores the print spool data in the print spool database 310 in step S960.

In step S962, the personal computer 500 requests to inquire the list of printable documents. The print management server 100 loads the list of printable documents from the print spool database 310 in step S964 and transmits the list of printable documents to the personal computer 500 in step S966.

In step S968, the personal computer 500 transmits a list of documents to be printed from the list of printable documents to the print management server 100. In step S970, the print management server 100 loads the list of documents to be printed from the print spool database 310.

In step S972, the print management server 100 requests the personal computer 500 to execute to output the corresponding document. In step S974, the personal computer 500 causes the printer 700 connected to an outside local network to execute the output. In step S976, the personal computer transmits the detailed output log information to the print management server 100. When the print is completed in the printer 700, the personal computer 500 receives the output result log information from the printer 700 and generates the detailed output log information to transmit the detailed output log information to the print management server 100. Next, in step S978, the print management server 100 stores the detailed output log information in the print database 300.

As described above, when the user outputs a document, the cloud-based secure printing system 2 of the present invention transmits print data to the print management server 100 first, and then remains an output security log. When the user is authenticated using the tag or beacon in the printer 700, the print data is transmitted to the corresponding printer 700 to perform the output.

According to the cloud-based secure printing system 2 of the present invention, when the printer 700 and the personal computer 500 of the user are on the same local network, an output job is performed by the same manner as the output method in the existing local network. However, in this case, only the output security log is separately extracted to be transmitted to the print management server 100 to be processed. This is because when the printer 700 and the personal computer 500 of the user are on the same local network, the print data needs to be transmitted to the print management server 100 and then downloaded as it is so that it is not efficient in terms of the network traffic.

Further, when the output is directly sent from the personal computer 500 of the user to the printer 700, the virtual print agent 510 of the personal computer 500 directly performs the output without using the print management server 100 and the print agent 200. In this case, the output security log is directly extracted by the virtual print agent 510 to be transmitted to the print management server 100. In this case, when the personal computer 500 of the user directly sends the output, the printer 700 is directly connected to the personal computer 500 of the user through the USB or the wireless LAN or connected to the same local network as a network printer. As a result, the document data is not transmitted to the print management server 100 but only minimum output security log information (that is, detailed output log information) is transmitted to the print management server 100. Therefore, the load of the network and the server may be reduced due to the exceptional processing.

Further, FIG. 9 is a view illustrating printer drivers equipped in a printer selecting item at the time of printing in a personal computer according to the present invention, FIG. 10 is a view illustrating a print option of a specific printer driver illustrated in FIG. 9, and FIG. 11 is a view illustrating a print option of a virtual printer driver illustrated in FIG. 9.

Referring to FIGS. 9 to 11, a plurality of printer drivers 550 connected to a print agent 200 is installed in the personal computer 500. The printer drivers 550 drive printers 700 which are directly connected to the personal computer 500 or connected on the local network 8 or drive printers 700 connected to the print agent 200 through a communication network 6.

To this end, when the virtual print agent 510 is installed, in the personal computer 500, a virtual printer driver (MWPrinter) 554 is automatically generated. One different printer driver among the printer drivers 550, for example, KONICA MINOLTA C364SeriesPCL 552 is a printer driver which is directly installed in the personal computer 500 by the user.

The reason why the virtual printer driver 554 is used in the present invention is to transmit print data to the print management server 100 or leave an output security log which is directly extracted by the virtual print agent when the user outputs a document. That is, in order to achieve complete output matter security, it is necessary to restrict output using a printer driver other than the virtual printer driver 554.

To this end, generally, the output using other printer drivers is restricted. To the contrary, the virtual print agent 510 of the present invention permits the output by other printer drivers, but extracts only the output security log to transmit the output security log to the print management server 100. For example, according to the former method, a printing API in a window operating system is hooked to cancel the printing by all the printer drivers other than the virtual printer driver 554. To the contrary, according to the latter method, the virtual printer agent 510 also hooks the printing API. The virtual printer agent 510 does not cancel the printing but intercepts the print data and stores the print data in a specific folder (not illustrated) of the personal computer 500. When the output security log is extracted and a job such as user authentication is completed, the print data is transmitted to the corresponding printer again. According to this manner, the load distribution of the print management server 100 is achieved. Further, additionally, the printer drivers which are used in the related art are used as it is.

A difference between a case when only the virtual printer driver 554 is used and a case when other printer drivers are also used may be easily confirmed by checking a print option separately provided by each printer driver as illustrated in FIGS. 10 and 11.

That is, when a preference button 556 is clicked after selecting other printer driver 552 or the virtual printer driver 554 in FIG. 9, as illustrated in FIG. 10 or 11, the print option which is provided by the printer drivers 552 and 554 may be confirmed. For example, FIG. 10 illustrates a print option provided by a printer driver 552 of a KONICA MINOLTA C364 Series PCL product and FIG. 11 illustrates a print option provided by the virtual printer driver 554.

Here, the print option provided by the virtual printer driver 554 is restricted to set standard options such as a layout, a paper, and a quality so that an implementation level for the print option is low. Therefore, the virtual printer driver 554 cannot provide a print option specified to the printer product so that when the print is limited only to the virtual printer driver 554 for the sake of security, it is very inconvenience for the user. Therefore, it is desirable to permit the print by the virtual printer driver 554 and other printer drivers 552.

Hereinabove, although the configuration and the action of the cloud-based secure printing system according to the present invention have been illustrated according to the detailed description and the drawings, this is just described by using the exemplary embodiment and various changes and modifications can be made without a scope without departing from the technical spirit of the present invention.

The invention claimed is:

1. A cloud-based secure printing system, comprising:
 a communication network;
 a mobile terminal which is equipped by a user and is connected to the communication network to transmit output data desired to be output;
 a plurality of printers which is connected to the communication network to be installed in different locations and is driven such that any one is selected according to a print request generated from the mobile terminal through the communication network to print the output data;
 a print management server which allows the mobile terminal to select one of the printers when the mobile terminal requests to print through the communication network, confirms a print authority of the user of the mobile terminal, receives the output data from the mobile terminal to control the selected printer to print the output data, and transmits a print result to the mobile terminal when the print is completed by the selected printer;
 at least one print agent which is connected to the communication network to manage the printers, is subject to output scheduling by the print management server, and receives the output data from the print management server to transmit the output data to the selected printer to print the output data;
 a personal computer which is equipped by the user and selects one of the printers, and requests the print management server to allow the printer selected by the print agent to perform printing;
 a print database which receives and stores the output data from the print management server and stores user information on a user of the mobile terminal and the personal computers and output history information of the user; and
 a print spool database which stores spool data corresponding to the output data by the print management server and a list of printable documents including the spool data, loads the list of printable documents to the print management server when at least one of the mobile terminal and the personal computers requests the printing, and provides a desired document to be selected from the list of the printable documents by the mobile terminal and the personal computer.

2. The cloud-based secure printing system according to claim 1, wherein the print management server is interlinked with database which stores and manages user information for confirming an output authority of the user and whether to be permitted to print a document requested to be printed to authenticate and confirm a printing authority for the user of the mobile terminal and the personal computer.

3. The cloud-based secure printing system according to claim 1, wherein the printer includes an authentication module for user authentication of the mobile terminal, and the print management server performs the user authentication for the printer selected by receiving tagging information in the authentication module which is transmitted from the mobile terminal by tagging the authentication module in the printer selected by the mobile terminal.

4. The cloud-based secure printing system according to claim 1, wherein the print agent transforms the output data transmitted from the print management server into PCL data and extracts text information from the transformed PCL data to inspect whether a security violation keyword is included in an output matter.

5. The cloud-based secure printing system according to claim 1, wherein any one of the print management server and the print agents generates and inserts a water mark into the output data to transmit the output data to the printer.

6. A processing method of a cloud-based secure printing system, the method comprising:
  activating a mobile print application installed therein for a print request by a mobile terminal and installing and registering a print agent driver for a plurality of printers which is connected to the print agent, by the print agent;
  confirming user authentication by interlinking the print management server with company personnel database when the mobile terminal requests a print management server to authenticate a user and confirming an authority of the user and an authority of a document requested to be printed;
  transmitting a user authentication result and whether to be permitted to print to the mobile terminal by the print management server, searching and selecting a target printer by the mobile terminal, and configuring an output option;
  transmitting print data to be output to the print management server by the mobile terminal;
  selecting the print agent suitable for the printer selected by the mobile terminal and transmitting the print data to the selected print agent, by the print management server;
  transforming the print data transmitted from the print management server into PCL data, by the print agent, to transmit the transformed PCL data to the selected printer to output the print data;
  transmitting print history information to the print management server, by the print agent, when the selected printer completely outputs; and
  a first step of requesting the print management server to print by a personal computer;
  wherein in the first step, when the personal computer requests the print management server to authenticate a user, the print management server is interlinked with the company personnel database to confirm the user authentication and transmit a user authentication result to the personal computer, the personal computer transmits a list of documents to be printed to the print management server, the print management server stores the list of documents to be printed, the user of the mobile terminal matching the personal computer tags the mobile terminal to an authentication module equipped in the printer desired by the user to transmit tagging information, which is transmitted from the authentication module of the printer to the mobile terminal, to the print management server and requests the print management server the list of printable documents, and the print management server transmits the list of printable documents to the mobile terminal so that the mobile terminal selects a document desired to be printed from the list of printable documents to request the print management server to execute the output.

7. The processing method according to claim 6, wherein when the selected printer and the personal computer of the user are on the same local network, only output security log information is extracted to be transmitted to the print management server.

8. A processing method of a cloud-based secure printing system, the method comprising:
  activating a mobile print application installed therein for a print request by a mobile terminal and installing and registering a print agent driver for a plurality of printers which is connected to the print agent, by the print agent;
  confirming user authentication by interlinking the print management server with company personnel database when the mobile terminal requests a print management server to authenticate a user and confirming an authority of the user and an authority of a document requested to be printed;
  transmitting a user authentication result and whether to be permitted to print to the mobile terminal by the print management server, searching and selecting a target printer by the mobile terminal, and configuring an output option;
  transmitting print data to be output to the print management server by the mobile terminal;
  selecting the print agent suitable for the printer selected by the mobile terminal and transmitting the print data to the selected print agent, by the print management server;
  transforming the print data transmitted from the print management server into PCL data, by the print agent, to transmit the transformed PCL data to the selected printer to output the print data;
  transmitting print history information to the print management server, by the print agent, when the selected printer completely outputs; and
  a second step of requesting the print management server to print by a personal computer located outside the company;
  wherein in the second step, when the personal computer located outside the company requests the print management server to authenticate a user, the print management server is interlinked with the company personnel database to confirm the user authentication and transmits an authentication result to the personal computer located outside the company, when the mobile terminal of the user matching the personal computer located outside the company requests the print management server to print, the personal computer requests the print management server to inquire the list of printable documents, the print management server transmits the list of printable documents to the personal computer located outside the company, the personal computer located outside the company transmits a document to be printed from the list of printable documents to the print management server, and the print management server requests the personal computer located outside the company to execute to output the document so that the personal computer located outside the company allows a printer connected to a local network outside the company to execute the output.

9. The processing method according to claim 8, wherein when the selected printer and the personal computer of the user are on the same local network, only output security log information is extracted to be transmitted to the print management server.

* * * * *